(12) United States Patent
Vanderzwet (10) Patent No.: US 7,214,902 B2
(45) Date of Patent: *May 8, 2007

(54) LOW IMPACT SPOT WELDING CYLINDER WITH DUAL PISTONS

(75) Inventor: Daniel P. Vanderzwet, Amherstburg (CA)

(73) Assignee: Doben Limited, Windsor, Ontario (CA)

( * ) Notice: Subject to any disclaimer, the term of this patent is extended or adjusted under 35 U.S.C. 154(b) by 156 days.

This patent is subject to a terminal disclaimer.

(21) Appl. No.: 11/010,622

(22) Filed: Dec. 13, 2004

(65) Prior Publication Data

US 2006/0124605 A1 Jun. 15, 2006

Related U.S. Application Data

(60) Provisional application No. 60/538,054, filed on Jan. 21, 2004.

(51) Int. Cl.
*B23K 9/28* (2006.01)
(52) U.S. Cl. ........................................ 219/89; 219/91.2
(58) Field of Classification Search ................. 219/89, 219/91.2
See application file for complete search history.

(56) References Cited

U.S. PATENT DOCUMENTS

| 2,370,009 A | 2/1945 | Clark et al. |
| 2,831,464 A | 4/1958 | Lillquist |
| 2,851,583 A | 9/1958 | Sciaky |
| 3,150,563 A | 9/1964 | Carrigan et al. |
| 3,400,242 A | 9/1968 | Waller |
| 3,417,221 A | 12/1968 | Hayward |
| 3,585,347 A | 6/1971 | Needham |
| 3,609,285 A | 9/1971 | Scarpelli |
| 3,708,648 A | 1/1973 | Croucher et al. |

(Continued)

FOREIGN PATENT DOCUMENTS

EP  1398105 A1  3/2004

(Continued)

OTHER PUBLICATIONS

International Search Report, Dec. 2, 2005.

*Primary Examiner*—Len Tran
(74) *Attorney, Agent, or Firm*—Carlson, Gaskey & Olds, PC (57) ABSTRACT

The present invention provides a weld cylinder having a dual piston arrangement. The cylinder has a middle separator separating the cylinder into two cavities. A retract piston assembly is arranged within one cavity. One of the pistons is arranged in the retract piston assembly and the other piston is arranged in the cavity without the retract piston assembly. The pistons support a rod that is moveable between home, intermediate, work, and advanced work positions. The rod moves rapidly from the home position to the intermediate position. However, the rod moves more slowly from the intermediate position to the work position to reduce the impact force. A cushion valve and cushion trip valve cooperate to increase the rate at which the rod moves from the work position to the advanced position so that the weld force increases rapidly to minimize increases in cycle time. The cushion valve is supported by the retract piston assembly, and the cushion trip valve is supported by the middle separator. With both the cushion valve and cushion trip valve moved from closed positions to open positions, the rate of fluid flow through the retract piston assembly increases to increase the rate at which the piston moves within the retract piston assembly.

17 Claims, 7 Drawing Sheets

U.S. PATENT DOCUMENTS

| | | |
|---|---|---|
| 4,028,522 A | 6/1977 | Chihoski et al. |
| 4,135,076 A | 1/1979 | Beneteau |
| 4,183,509 A * | 1/1980 | Nishikawa et al. ......... 267/218 |
| 4,296,304 A | 10/1981 | Defourny |
| 4,296,679 A | 10/1981 | Mattsson |
| 4,419,558 A | 12/1983 | Stiebel |
| 4,441,006 A | 4/1984 | Machida et al. |
| 4,447,700 A | 5/1984 | Cohen |
| 4,596,917 A | 6/1986 | Nied et al. |
| 4,700,611 A | 10/1987 | Kaneko |
| 4,861,960 A | 8/1989 | Haefner et al. |
| 5,174,191 A | 12/1992 | Leinweber et al. |
| 5,177,337 A | 1/1993 | Ward |
| 5,191,825 A | 3/1993 | Beneteau et al. |
| 5,194,709 A | 3/1993 | Ichikawa et al. |
| 5,275,540 A | 1/1994 | Brown |
| 5,349,151 A | 9/1994 | Eisbrenner et al. |
| 5,393,950 A | 2/1995 | Killian |
| 5,558,785 A | 9/1996 | Killian et al. |
| 5,587,091 A | 12/1996 | Kawagoe et al. |
| 5,623,861 A | 4/1997 | Ward et al. |
| 5,632,912 A | 5/1997 | Cecil |
| 5,808,266 A | 9/1998 | Cecil |
| 6,020,569 A | 2/2000 | Cecil et al. |
| 6,043,449 A | 3/2000 | Kanjo |
| 6,067,696 A | 5/2000 | Cecil et al. |
| 6,072,145 A | 6/2000 | Suita et al. |
| 6,118,095 A | 9/2000 | Nagano |
| 6,232,572 B1 | 5/2001 | Kanjo |
| 6,274,840 B1 | 8/2001 | Kanjo |
| 6,313,427 B1 | 11/2001 | Suita |
| RE37,607 E | 3/2002 | Cecil |
| 6,408,740 B1 | 6/2002 | Holt et al. |
| 6,414,259 B2 | 7/2002 | Kanjo |
| 6,633,015 B2 | 10/2003 | Nguyen et al. |
| 6,722,257 B2 | 4/2004 | Yoh et al. |

FOREIGN PATENT DOCUMENTS

| | | |
|---|---|---|
| JP | 08-309552 A2 | 11/1996 |

* cited by examiner

A = Pneumatic control value switched
B = Cylinder motion initiates
C = Cylinder front rod contacts workpiece
D = Cushion valve opens
E = Acceptable weld working force

*Fig-8*

| Cylinder Position | Port | | | | |
|---|---|---|---|---|---|
| | P1 | P2 | P3 | P4 | P5 |
| Home | Vented | Pressurized | Vented | Pressurized | Vented |
| Intermediate | Vented | Pressurized | Pressurized | Vented | Vented |
| Work | Pressurized | Vented | Pressurized | Vented | Vented |

*Fig-9*

LOW IMPACT SPOT WELDING CYLINDER WITH DUAL PISTONS

The application claims priority to U.S. Provisional Application No. 60/538,054 which was filed on Jan. 21, 2004.

BACKGROUND OF THE INVENTION

The present invention relates to a weld gun used in spot welding, and more particularly, the invention relates to a dual piston welding cylinder for the weld gun generating a low impact force when the weld gun engages the workpiece to spot weld.

A typical weld gun used in spot welding includes opposing arms each having an electrode that applies current to a workpiece to generate a weld nugget, for example, between two sheets of metal. The electrodes include malleable welding caps typically manufactured from a copper alloy. Repeated impact force between the welding caps and the workpiece plastically deforms the welding caps thereby increasing the wear of the welding caps and reducing the service life, which increases operating cost.

Impact force between the welding caps and workpiece also generates workpiece distortion, which can have detrimental effects on the welding process and quality of the weld.

Several prior art weld cylinders have endeavored to reduce the impact force between the welding caps and workpiece to extend the life of welding caps and reduce workpiece distortion. One approach in the prior art has been to slow the advance of the electrodes toward one another by slowing the movement of the pneumatic cylinder. However, while this approach reduces the impact force it also increases the cycle time for a spot weld, which is undesirable.

Another approach in the prior art is to utilize external devices or peripheral components such as valves, regulators, restrictors, and/or electrical switches to control the pressure, timing, and rate that the air is supplied to the pneumatic cylinder thereby controlling the impact force. However, the addition of these externals devices may be difficult to integrate with existing weld guns and is also costly since additional components must be added to the welding system.

Therefore, what is needed is a pneumatic cylinder that reduces impact force between the welding caps and the workpiece but that does not require additional, costly external devices and increases in cycle time.

SUMMARY OF THE INVENTION

The present invention provides a weld cylinder having a dual piston arrangement. The cylinder has a middle separator separating the cylinder into two cavities. A retract piston assembly is arranged within one cavity. One of the pistons is arranged in the retract piston assembly and the other piston is arranged in the cavity without the retract piston assembly. The pistons support a rod that is moveable between home, intermediate, work, and advanced work positions.

The rod moves rapidly from the home position to the intermediate position. However, the rod moves more slowly from the intermediate position to the work position to reduce the impact force.

A cushion valve and cushion trip valve cooperate to increase the rate at which the rod moves from the work position to the advanced position so that the weld force increases rapidly to minimize increases in cycle time. The cushion valve is supported by the retract piston assembly, and the cushion trip valve is supported by the middle separator. With both the cushion valve and cushion trip valve moved from closed positions to open positions, the rate of fluid flow through the retract piston assembly increases to increase the rate at which the piston moves within the retract piston assembly.

Accordingly, the present invention provides a pneumatic cylinder that reduces force between the welding caps and the workpiece, but that does not require additional, costly external devices and increases in cycle time.

These and other features of the present invention can be best understood from the following specification and drawings, the following of which is a brief description.

DETAILED DESCRIPTION OF THE PREFERRED EMBODIMENT

Figure 1:
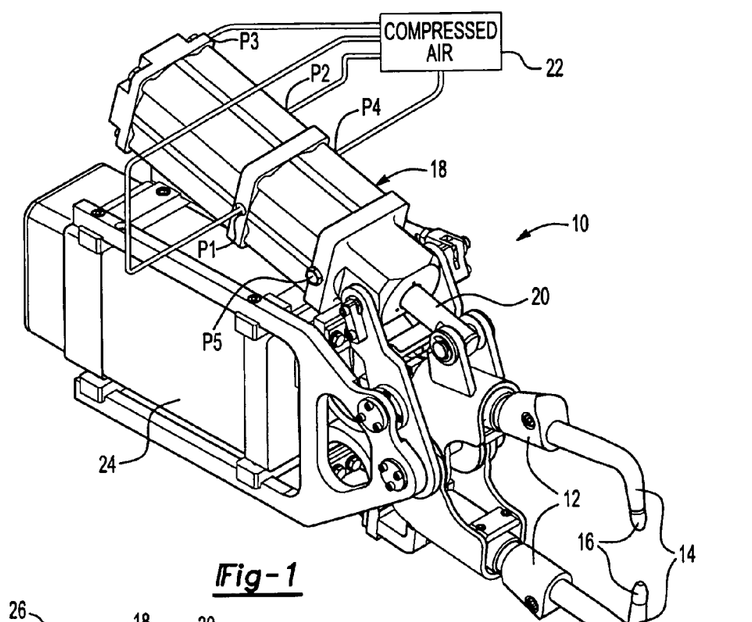
FIG. 1 is a perspective view of an inventive weld gun.

An inventive weld gun 10 including an inventive pneumatic cylinder 18 is shown in FIG. 1. The pneumatic cylinder 18 is a four port arrangement ports (P1–P4) that can be easily integrated into existing weld guns utilizing four ports. That is, the plumbing for prior art weld guns having four ports can be used with the inventive pneumatic cylinder 18. The fifth port, P5, is a port through which pressurized air is vented from the pneumatic cylinder 18 to atmosphere. The ports P1–P4 are fluidly connected to a compressed air source 22. The ports P1–P4 are connected to the compressed air source 22 though valves that control the timing of the air signals provided to the pneumatic cylinder 18 by selectively opening and closing the valves.

Figure 2:
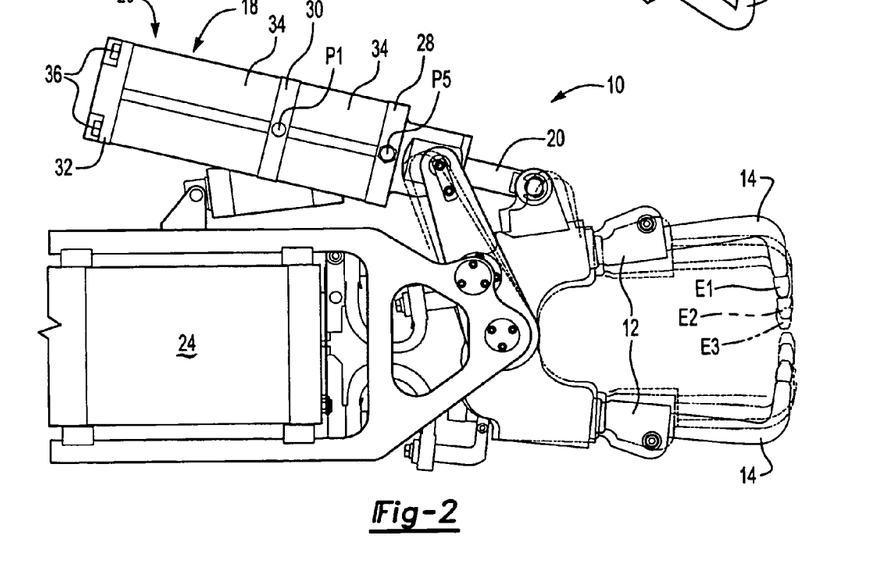
FIG. 2 is a side elevational view of the weld gun shown in FIG. 1.

The weld gun 10 includes opposing arms 12 that each include an electrode 14. The electrodes 14 include welding caps 16 that are typically manufactured from a malleable copper alloy. The welding caps 16 engage a workpiece (not shown) to apply a welding current to the workpiece to generate a weld nugget, as is well known in the art. The arms 12 are typically supported by the weld gun 10 and interconnected to one another at various pivot points. A rod 20 of the pneumatic cylinder 18 is typically connected to one of the arms 12 to actuate the electrodes 14 and welding cap 16 between first, second, and third electrode positions E1–E3, which is best shown in FIG. 2. Current is applied to the electrodes 14 when in the third position E3 using a current source 24 that is electrically connected to the electrodes 14.

The pneumatic cylinder 18 includes a cylinder body 26 that has two barrels 34 spaced apart by a middle separator 30. An end cap 32 is arranged adjacent to one of the barrels 34 and a front block 28 is arranged adjacent to the other barrel 34. The fasteners 36 secure the components of the cylinder body 26 together so the pneumatic cylinder 18 can be pressurized at ports P1–P4 without leakage from the cylinder body 26.

The multiple component cylinder body 26 and its configuration described above is exemplary of a four/port pneumatic cylinder. However, it should be understood that other configurations may be used and still fall within the scope of the present invention.

Figure 3:
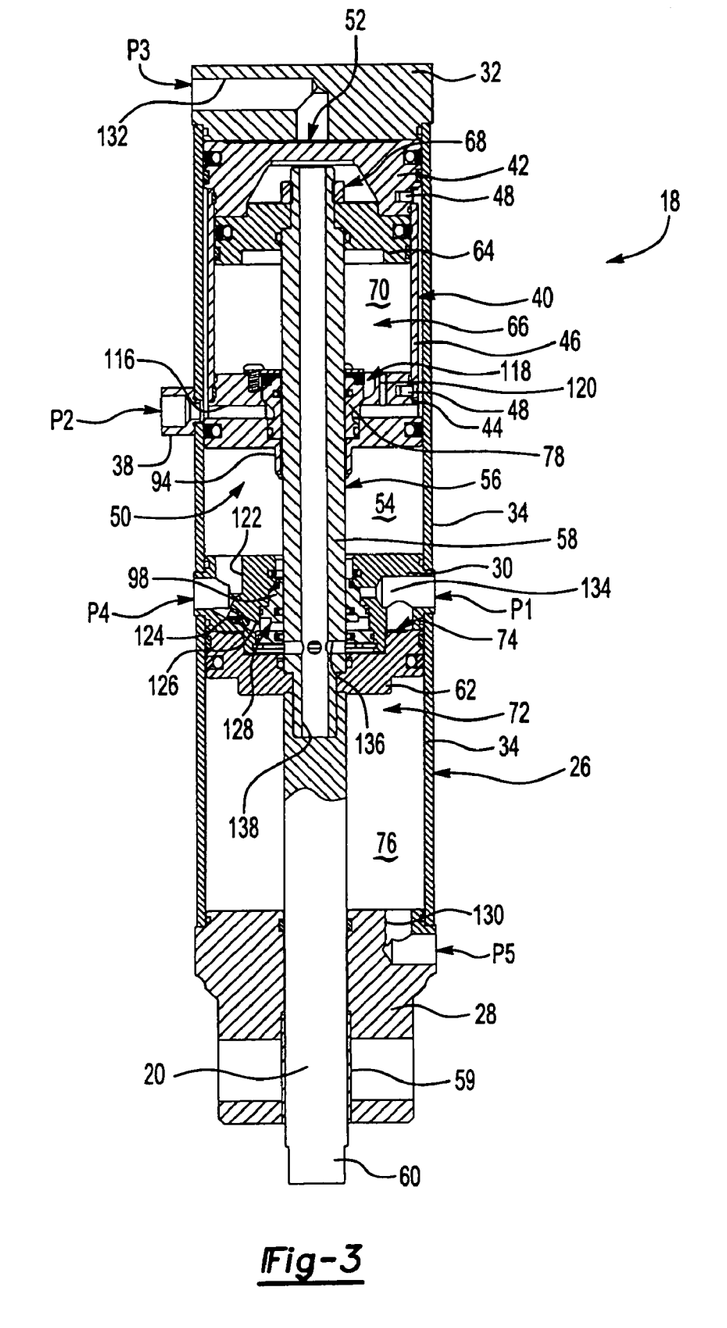
FIG. 3 is a cross-sectional view of a pneumatic cylinder for the inventive weld gun with the pneumatic cylinder in a home position.
Figure 4:
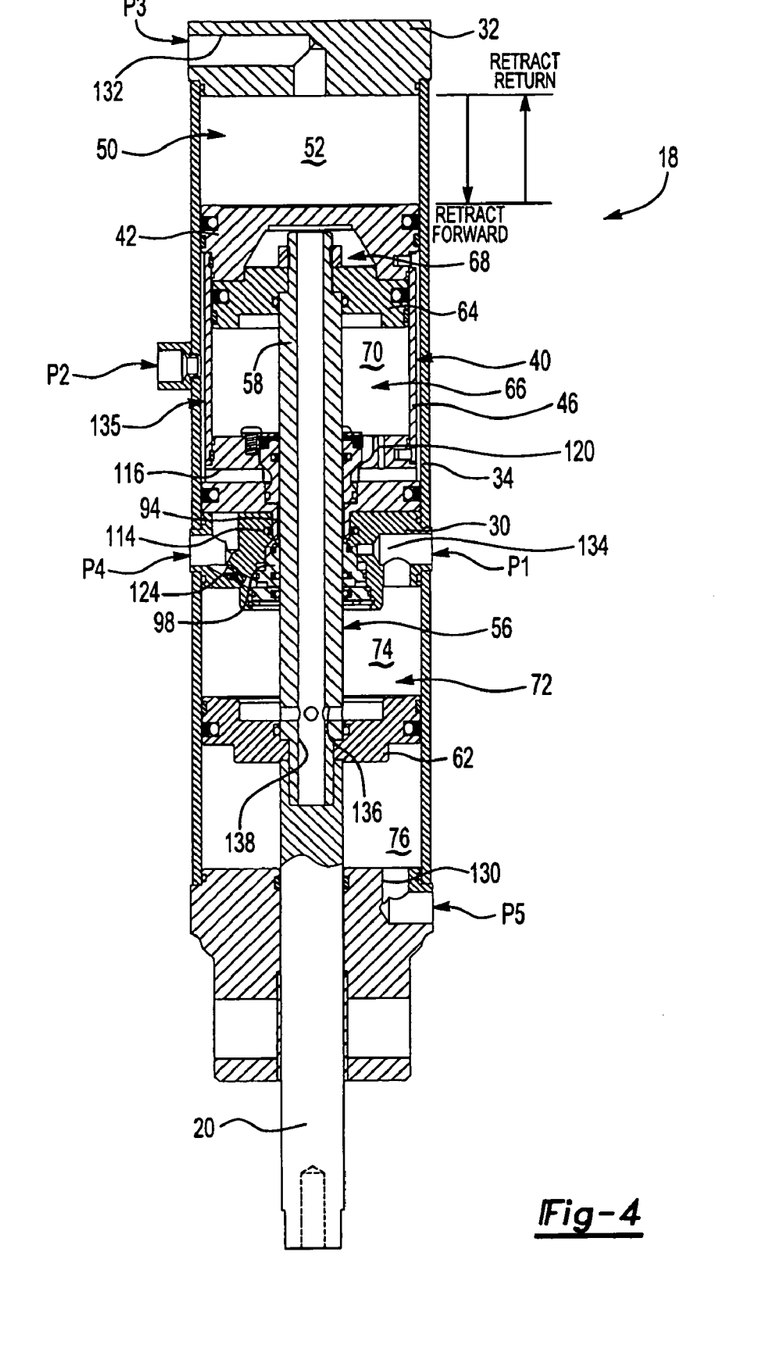
FIG. 4 is a cross-sectional view of the pneumatic cylinder shown in FIG. 3 with the pneumatic cylinder in an intermediate position.
Figure 5:
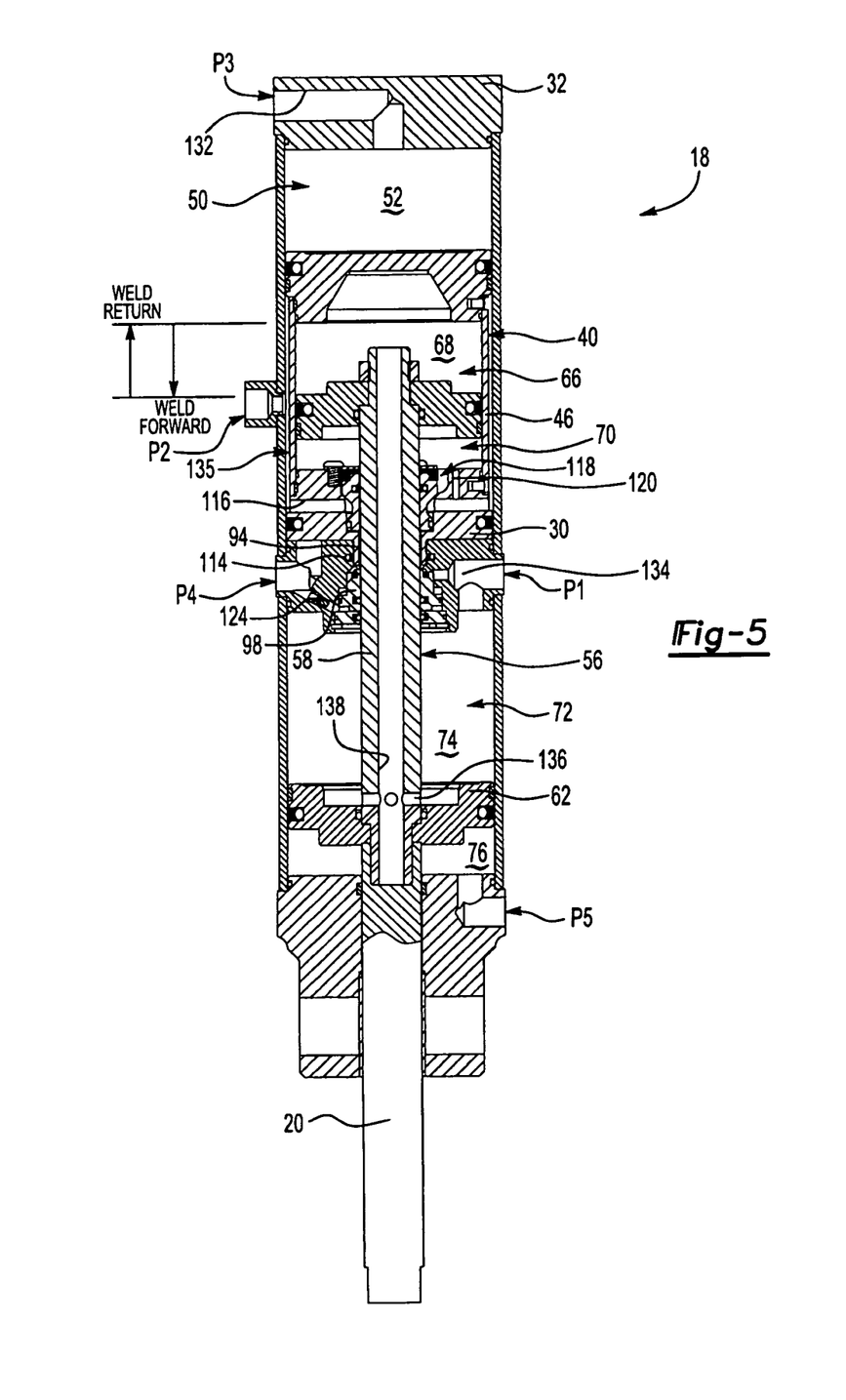
FIG. 5 is a cross-sectional view of the pneumatic cylinder shown in FIG. 3 with the pneumatic cylinder in a work position.

In the example embodiment of the inventive pneumatic cylinder 18, three cylinder positions are generated, corresponding to the electrode positions E1–E3. FIG. 3 depicts a home position of the pneumatic cylinder 18, which corresponds to first electrode position E1. FIG. 4 is an intermediate position of the pneumatic cylinder 18, which corresponds to second electrode position E2. FIG. 5 is a work position of the pneumatic cylinder 18, which corresponds to third position E3. The work position also has an advanced position (FIG. 6) in which the rod 20 moves forward an additional distance to increase the weld force on the workpiece.

The present invention pneumatic cylinder 18 moves the rod 20 quickly from the home position (FIG. 3) to the intermediate position (FIG. 4) in which the welding caps 16 are in close proximity to the workpiece. However, the rod 20 moves more slowly from the intermediate position (FIG. 4) to the work position (FIG. 5) in which the welding cap 16 sufficiently forcefully engage the workpiece. The rod 20 moves forward and additional distance to increase the weld force so that current can be applied to produce a weld nugget. The slower movement from the intermediate position (FIG. 4) to the work position (FIG. 5) ensures that the impact force between the welding cap 16 and the workpiece is minimized. However, the preceding, more rapid movement of the rod 20 ensures that cycle time is not unduly compromised.

Referring to FIG. 3, ports P1 and P4 are provided by the middle separator 30. Port P2 is provided by a port adaptor 38 secured to one of the barrels 34. Port P3 is provided by the end cap 32 and port P5 is provided by the front block 28, which also slideably supports the rod 20 with bushing 59.

A retract piston assembly 40 is slideably supported within one of the barrels 34. The retract piston assembly 40 includes a barrel 46 having forward and rearward flanges 42 and 44 secured at opposite ends using retaining ribbons 48. The retract piston assembly 40 separates a cavity 50 provided by the barrel 34 into first and second chambers 52 and 54. The retract piston assembly 40 is shown in a retract-return position in FIG. 3 and a retract-forward position in FIG. 4.

A piston assembly 56 includes first and second weld flanges 62 and 64. The first weld flange 62 is secured to the rod 20 approximately midway along the length of the rod 20. In the example shown, the rod 20 is two pieces, including a portion 58, to facilitate assembly of the piston assembly 56 and provide the passages within the rod 20, which will be discussed below.

The second weld flange 64 is secured to an end of the rod 20 opposite an end 60 of the rod 20, which is secured to one of the arms 12. The second weld flange 64 is arranged within the retract piston assembly 40 between the forward and rear flanges 42 and 44. The retract piston assembly 40 includes a cavity 66 that is separated by the second weld flange 64 into third and fourth chambers 68 and 70. The second weld flange 64 is shown in a weld-return position in FIGS. 3 and 4 and a weld-forward position in FIG. 5.

The first weld flange 62 is arranged within a cavity 72 provided by the barrel 34 opposite the retract piston assembly 40. The first weld flange 62 separates the cavity 72 into fifth and sixth chambers 74 and 76. The first weld flange 62 is shown in a weld-return position in FIG. 3 and a weld-forward position in FIG. 5. The first weld flange 62 has not yet reached the weld-forward position in FIG. 4, which illustrates the intermediate position of the pneumatic cylinder 18. The first weld flange 62 is shown in an advanced position relative to the weld-return position illustrated in FIG. 3 due to the retract piston assembly 40 being in the retract-forward position.

Figure 6:
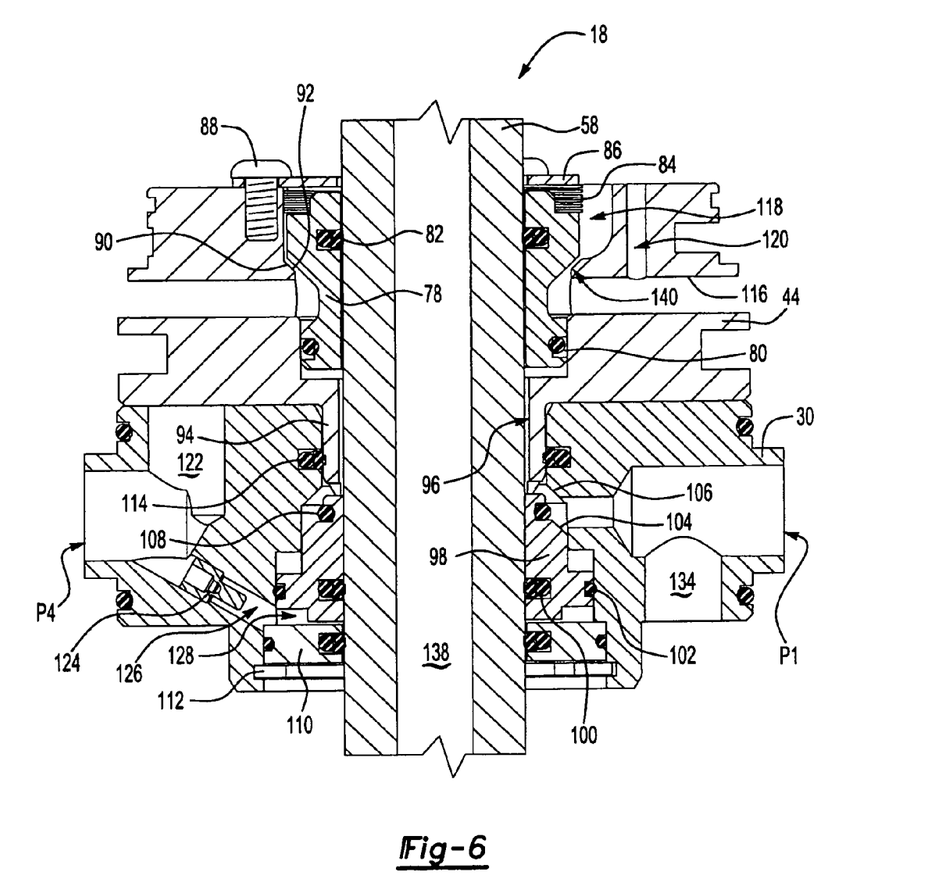
FIG. 6 is an enlarged cross-sectional view of the inventive cushion valve and cushion relief valve in open positions.

The work position depicted in FIG. 5 includes a range of positions once the rod 20 reaches the position shown in FIG. 5. The rod 20 continues to advance a distance as the pressure builds to allow the weld-force pressure to build quickly. Referring to FIG. 6, the inventive pneumatic cylinder 18 includes a cushion valve 78 supported by the rearward flange 44 of the retract piston assembly 40. A seal 80 is arranged between the cushion valve 78 and the rear flange 44. Another seal 82 is arranged between the cushion valve 78 and the rod 20. A spring 84 is arranged between a plate 86, which is secured to the rearward flange 44 by a screw 88, and the cushion valve 78. The spring 84 biases the cushion valve 78 to a closed position, which is shown in FIGS. 3–5. The cushion valve 78 is shown in an open position, which will be discussed in more detail below.

The cushion valve 78 includes a first tapered surface 90 that cooperates to seal with a complimentary second tapered surface 92 provided by the rearward flange 44. The tapered surfaces 90 and 92 sealing engage one another when the cushion valve 78 is in the closed position.

The rearward flange 44 has an annular protrusion 94 that extends downwardly away from the rearward flange 44 toward the middle separator 30. The protrusion 94 is spaced outwardly away form the rod 20 to provide an annular bleed passage 96.

The middle separator 30 supports a cushion trip valve 98. An inner seal 100 is arranged between the cushion trip valve 98 and the portion 58 of the rod 20. An outer seal 102 is arranged between the cushion trip valve 98 and the middle separator 30. The cushion trip valve 98 includes a third tapered surface 104 that engages a complimentary fourth tapered surface 106 provided by the middle separator 30 when the cushion trip valve 98 is in a closed position. A seal 108 further ensures that the cushion trips valve 98 seals against the middle separator 30 in the closed position.

A ring plate 110 is arranged adjacent to the cushion trip valve 98 and is retained relative to the separator 30 by a clip 112 that is received in an annular groove in the middle separator 30. The removable ring plate 110 and clip 112 facilitate assembly of the cushion trip valve 98 within the middle separator 30.

A protrusion seal 114 is arranged between the protrusion 94 and the middle separator 30 when the retract piston assembly 40 is in the retract-forward position, shown in FIGS. 4 and 5.

A radial passage 116 is arranged in the rearward flange 44. The passage 116 is in fluid communication with the port P2. The barrel 46 is spaced from the barrel 34 to ensure that the port P2 remains in fluid communication with the passage 116 as the retract piston assembly 40 moves axially within the cylinder body 26.

The cushion valve 78 includes a portion that is radially spaced from the rearward flange 44 to create a passage 118. The passages 116 and 118 are blocked from one another when the cushion valve 78 is in the closed position. A restricting orifice 120 fluidly connects the passage 116 to the fourth chamber 70.

A passage 122 is arranged in the middle separator 30 to fluidly connect the port P4 to the second chamber 54. The passage 122 is also in fluid communication with a check valve 124 that separates the passage 122 from a passage 126. The check valve 124 permits fluid to flow from the passage 122 to the passage 126, but not in the opposite direction. A seventh chamber 128 is provided by a space between the cushion trip valve 98 and the ring plate 110.

A vent passage 130 is provided by the front block 28 and fluidly connects the port P5 to the sixth chamber 76. A passage 132 is provided by the end cap 32 and fluidly connects the port P3 to the first chamber 52. A passage 134 is provided by the middle separator 30 and fluid connects the port P1 to the fifth chamber 74.

The portion 58 of the rod 20 includes a cross hole 136. A longitudinal hole 138 in the portion 58 of the rod 20 fluidly connects the third chamber 68 and the fifth chamber 74. A relief passage 140 is provided between the cushion valve 78 and the rearward flange 44 when the cushion valve 78 is in the open position, shown in FIG. 6, fluidly connecting the passages 116 and 118.

Figure 9:
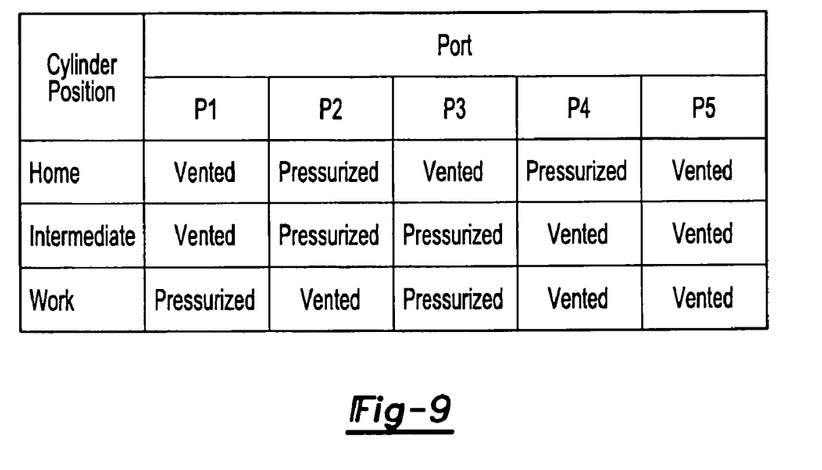
FIG. 9 is a table of the state at each pressure port for each pneumatic cylinder position.

FIG. 9 depicts a table illustrating the status at ports P1–P5 for the home, intermediate, and work positions. Pressure is selectively provided to the ports P1–P4 to attain the desired position.

Referring to FIG. 3, ports P1, P3 and P5 are vented to atmosphere. Port P2 is pressurized. Pressurized air flows through passage 116 through restricting orifice 120 into fourth chamber 70 to bias the second flange 64 to the weld-return position.

Port P4 is pressurized providing pressurized air to the second chamber 54 through passage 122 to bias the retract piston assembly 40 to the retract-return position. Thus with the ports P2 and P4 pressurized and the other ports P1, P3 and P5 vented, the rod 20 is moved to the home position shown in FIG. 3. The cushion trip valve 98 is biased to the closed position with pressurized fluid from port P4 that flows to the seventh chamber 128 through check valve 124. The seventh chamber 128 remains pressurized and acts as a spring to hold the cushion trip valve 98 closed. Alternatively, or in addition to the pressurized air in chamber 128, a mechanical spring may be arranged in the chamber 128 to bias the cushion trip valve closed.

Referring to FIG. 4, the ports P1, P4 and P5 are vented to atmosphere. Ports P2 and P3 are pressurized.

Maintaining pressure at port P2 retains the second flange 64 in the weld-return position. Pressurizing port P3 with port P4 vented to atmosphere biases the retract piston assembly 40 to the retract-forward position. The forward movement of the first weld flange 62 within the cavity 72 is uninhibited since the ports P1 and P5 are vented to atmosphere.

With the ports P2 and P3 pressurized and the ports P1, P4 and P5 vented to atmosphere, the rod 20 moves from the home position (FIG. 3) to the intermediate position shown in FIG. 4.

Referring to FIG. 5, the ports P2, P4 and P5 are vented to atmosphere. Ports P1 and P3 are pressurized.

The pressurized port P3 maintains the retract piston assembly 40 in the forward-retract position. Pressurizing port P1 provides pressurized air to the fifth chamber 74 through passage 134 to move the first weld flange 62 to a more advanced position than that shown in FIG. 4, which depicts the intermediate position. The first weld flange 62 moves uninhibited to a more advanced position since the port P5 is vented to atmosphere. The second weld flange 64 also moves uninhibited to a more advanced position within the cavity 66 of the retract piston assembly 40 since the P2 is vented to atmosphere.

Referring to FIG. 6, the protrusion 94 is received by the middle separator 30 in both the intermediate (FIG. 4) and work (FIG. 5) positions. The protrusion 94 acts against the cushion trip valve 98 overcoming the pressurized seventh chamber 128 to open the cushion trip valve 98. The port P1 is not pressurized, however, until the piston assembly 56 reaches the weld-forward position. With the port P1 pressurized, pressurized fluid is permitted to flow through the passage 134 through the bleed passage 96 since the protrusion 94 has biased the cushion trip valve 98 downward to an open position. With the cushion trip valve 98 in an open position, the third and fourth tapered surfaces 104 and 106 are no longer in sealing engagement with one another thereby permitting fluid communication between the passage 134 and the bleed passage 96.

Pressurized fluid from the bleed passage 96 biases the cushion valve 78 upward overcoming the force of spring 84 thereby creating a relief passage 140 that fluidly connects the passages 116 and 118. Since the port P2 is vented to atmosphere, the cushion valve 78 moving to the open position more rapidly permits the first weld flange 62 to move to a more advanced position since pressurized air now evacuates not only through the restricting orifice 120 but also through the relief passage 140. As a result, the cushion valve 78 moving from the closed position to the open position permits more rapid movement of the rod 20 to allow the weld force pressure to build quickly.

Figure 8:
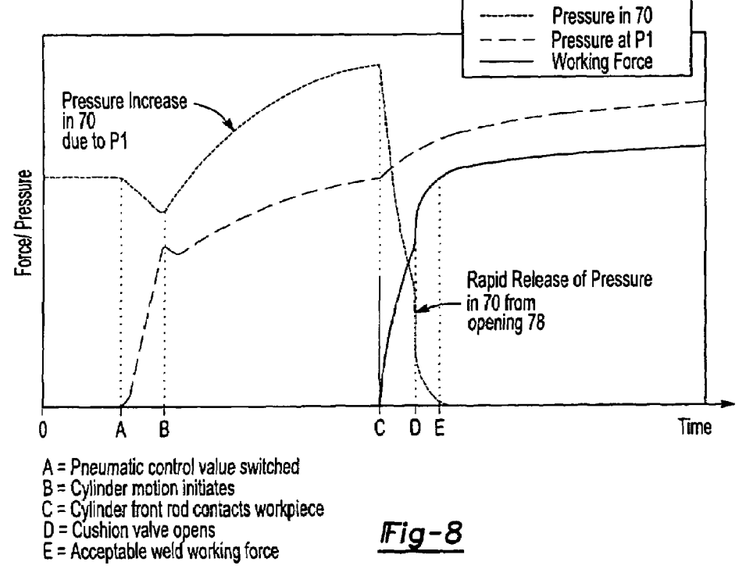
FIG. 8 graphically depicts selected pressures within the inventive pneumatic cylinder and weld working force verses time.

Said another way, the restricting orifice 120 alone permits the pressurized air to evacuate from the fourth chamber 70 more slowly, which reduces the impact force. However, after a predetermined pressure has been reached, which is provided by the pressure at port P1, the cushion valve 78 opens to increase the rate at which the pressurized air evacuates from the fourth chamber 70. The relationship of these pressures is illustrated in FIG. 8. The pressure at which the cushion valve 78 opens is determined, in part, by the biasing force provided by the spring 84.

Figure 7:
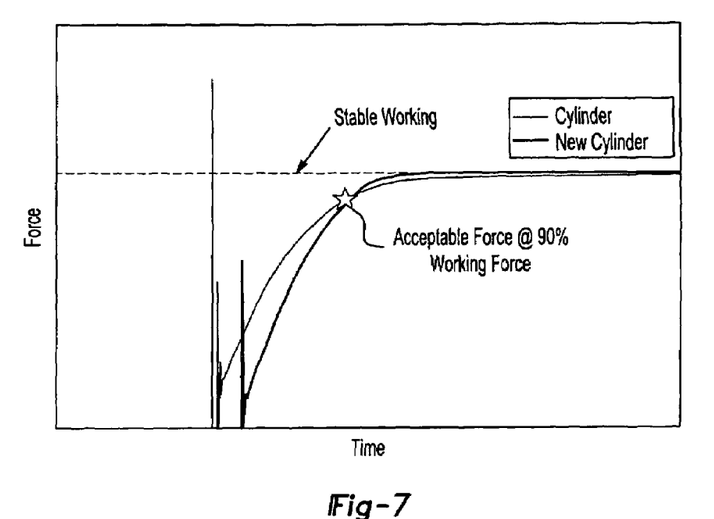
FIG. 7 is a graphical depiction of the inventive pneumatic cylinder as compared to a typical prior art cylinder.

FIG. 7 depicts the force curves for both prior art cylinders and the inventive weld cylinder. As can be seen, the force spike indicative of the impact force is much less (about half) with the inventive weld cylinder. However, the inventive weld cylinder reaches an acceptable working force in the same time as a prior art weld cylinder and, as a result, cylinder time is not increased.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A weld cylinder comprising:
   a cylinder having a rod providing home, intermediate, work and advanced work positions;
   a piston assembly having a piston arranged within the cylinder and separating first and second chambers, the piston axially movable between first and second positions, the piston supporting the rod;

a restricting orifice regulating fluid flow out of the first chamber as the piston moves from the first position to the second position;

a cushion valve movable between closed and open positions in response to an input, the cushion valve supplementing the fluid flow out of the first chamber when in the open position; and a trigger actuatable to a tripped state, which provides the input, in response to movement of the piston assembly from the first position to the second position, the cushion valve moving from the closed position to the open position with the trigger in the trip state.

2. The weld cylinder according to claim 1, wherein the cushion valve is in the closed position in the home, intermediate and work positions, and the cushion valve is in the open position in the advanced work position.

3. The weld cylinder according to claim 2, wherein the trigger is a cushion trip valve providing the input to the cushion valve, the cushion valve moving from the closed position to the open position with the rod in the work position.

4. The weld cylinder according to claim 2, wherein the cushion valve is urged to the closed position by a spring biasing force.

5. The weld cylinder according to claim 4, the cushion trip valve includes closed and open positions, the open position corresponding to the trip state, the cushion trip valve introducing fluid pressure in its open position to the cushion valve to overcome the biasing force and move the cushion valve to its open position.

6. The weld cylinder according to claim 1, wherein the rod moves between the intermediate and work positions at a first rate, and the rod moves between the work and advanced work positions at a second rate greater than the first rate.

7. The weld cylinder according to claim 3, wherein the cylinder includes a body having barrels spaced apart by a middle separator, an end cap at an end of one barrel opposite the middle separator, and a front block at an end of another barrel opposite the middle separator, the cushion trip valve supported by the middle separator.

8. The weld cylinder according to claim 7, wherein the piston assembly includes another piston supporting the rod, the one barrel supporting the piston assembly, and the other piston arranged in the other barrel.

9. The weld cylinder according to claim 1, wherein the piston assembly is a retract piston assembly arranged in the cylinder and axially movable between retract-return and retract-forward positions;

and the piston is arranged in the retract piston assembly, the pistons supporting the rod and axially movable between weld-return and weld-forward positions; and wherein the home position corresponds to the retract-return and weld-return positions, the intermediate position corresponds to the retract-forward and weld-return positions, the work position corresponds to the retract-forward and weld-forward positions, and the advanced work position corresponds to the retract-forward and weld-forward positions with the cushion valve in the open position.

10. The weld cylinder according to claim 9, wherein the trigger is actuated by the retract piston assembly in the retract-forward position.

11. The weld cylinder according to claim 7, wherein the cylinder includes four pressure ports in fluid communication with a pressurized fluid source.

12. The weld cylinder according to claim 11, wherein a first and fourth pressure port is provided by the middle separator, a second pressure port is provided by the one barrel, and the third pressure port in provided by the end cap.

13. The weld cylinder according to claim 1, wherein the trigger is arranged within the cylinder.

14. The weld cylinder according to claim 13, wherein the cushion valve is arranged within the cylinder.

15. The weld cylinder according to claim 13, wherein the piston assembly engages the trigger to move the trigger to the tripped state.

16. The weld cylinder according to claim 1, wherein the piston assembly is a retract piston assembly separating third and fourth chambers and moveable between third and fourth positions, the retract piston assembly providing the first and second chambers.

17. The weld cylinder according to claim 16, wherein the retract piston assembly includes a protrusion engaging the trigger and moving the trigger to the tripped state when in the work position.

* * * * *

UNITED STATES PATENT AND TRADEMARK OFFICE
CERTIFICATE OF CORRECTION

| | | |
|---|---|---|
| PATENT NO. | : 7,214,902 B2 | |
| APPLICATION NO. | : 11/010622 | |
| DATED | : May 8, 2007 | |
| INVENTOR(S) | : Daniel P. Vanderzwet | |

It is certified that error appears in the above-identified patent and that said Letters Patent is hereby corrected as shown below:

Claim 9, Column 8, line 6: "pistons" should be --piston--

Signed and Sealed this

Third Day of July, 2007

JON W. DUDAS
*Director of the United States Patent and Trademark Office*